(12) United States Patent
Heilig et al.

(10) Patent No.: US 12,343,901 B2
(45) Date of Patent: Jul. 1, 2025

(54) ELECTRIC DRIVE FOR A MIXER DRUM

(71) Applicant: ZF Friedrichshafen AG, Friedrichshafen (DE)

(72) Inventors: Eduard Heilig, Friedrichshafen (DE); Udo Brehmer, Friedrichshafen (DE); Raphael Zohner, Huenfelden (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 159 days.

(21) Appl. No.: 18/020,631

(22) PCT Filed: Jul. 27, 2021

(86) PCT No.: PCT/EP2021/070931
§ 371 (c)(1),
(2) Date: Feb. 10, 2023

(87) PCT Pub. No.: WO2022/033862
PCT Pub. Date: Feb. 17, 2022

(65) Prior Publication Data
US 2023/0302681 A1    Sep. 28, 2023

(30) Foreign Application Priority Data

Aug. 14, 2020  (DE) .................... 10 2020 210 383.6

(51) Int. Cl.
*H02P 1/00*    (2006.01)
*B28C 5/42*    (2006.01)
*H01M 10/44*   (2006.01)
*H02P 3/00*    (2006.01)
*H02P 5/00*    (2016.01)

(52) U.S. Cl.
CPC ............. *B28C 5/421* (2013.01); *H01M 10/44* (2013.01); *H01M 2220/20* (2013.01)

(58) Field of Classification Search
CPC ............................... H01M 10/44; B28C 5/421
USPC ......................................................... 318/139
See application file for complete search history.

(56) References Cited

U.S. PATENT DOCUMENTS

| 2012/0207620 A1* | 8/2012 | Dalum ................. B60W 20/40 903/903 |
| 2015/0306973 A1* | 10/2015 | Gunnerud ............... B60L 53/20 320/162 |
| 2022/0152871 A1* | 5/2022 | Heilig .................... B60L 50/61 |

FOREIGN PATENT DOCUMENTS

| EP | 2719510 A1 | 4/2014 |
| EP | 2807007 B1 | 5/2018 |
| WO | WO 2016198044 A2 | 12/2016 |

* cited by examiner

*Primary Examiner* — Erick D Glass
(74) *Attorney, Agent, or Firm* — LEYDIG, VOIT & MAYER, LTD.

(57) ABSTRACT

An electric drive for a mixer drum, including a high-voltage DC voltage power supply to which at least one battery, a power converter and at least one external interface for connecting a stationary electric power supply are connected. The at least one battery is charged only via the at least one external interface, wherein a controller is configured to control flows of energy from and to components connected to the high-voltage DC voltage power supply.

11 Claims, 3 Drawing Sheets

ELECTRIC DRIVE FOR A MIXER DRUM

CROSS REFERENCE TO RELATED APPLICATIONS

This application is a U.S. National Phase application under 35 U.S.C. § 371 of International Application No. PCT/EP2021/070931, filed on Jul. 27, 2021, and claims benefit to German Patent Application No. DE 10 2020 210 383.6, filed on Aug. 14, 2020. The International Application was published in German on Feb. 17, 2022 as WO 2022/033862 A1 under PCT Article 21(2).

FIELD

The invention relates to an electric drive for a mixer drum and to a method for operating such an electric drives.

BACKGROUND

EP 2 807 007 B1 discloses a truck mixer having an apparatus for rotating the drum of the concrete mixer, wherein the drum is rotated purely electrically. The electric energy therefor is generated by way of a generator which is driven by the internal combustion engine via a power take-off. This electric energy is used to charge a battery, which then supplies power to the electric motor for rotating the drum. Furthermore, the battery can also be charged using the stationary power supply system and using an energy recovery system of the truck mixer.

SUMMARY

In an embodiment, the present disclosure provides an electric drive for a mixer drum, comprising a high-voltage DC voltage power supply to which at least one battery, a power converter and at least one external interface for connecting a stationary electric power supply are connected. The at least one battery is charged only via the at least one external interface, wherein a controller is configured to control flows of energy from and to components connected to the high-voltage DC voltage power supply.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
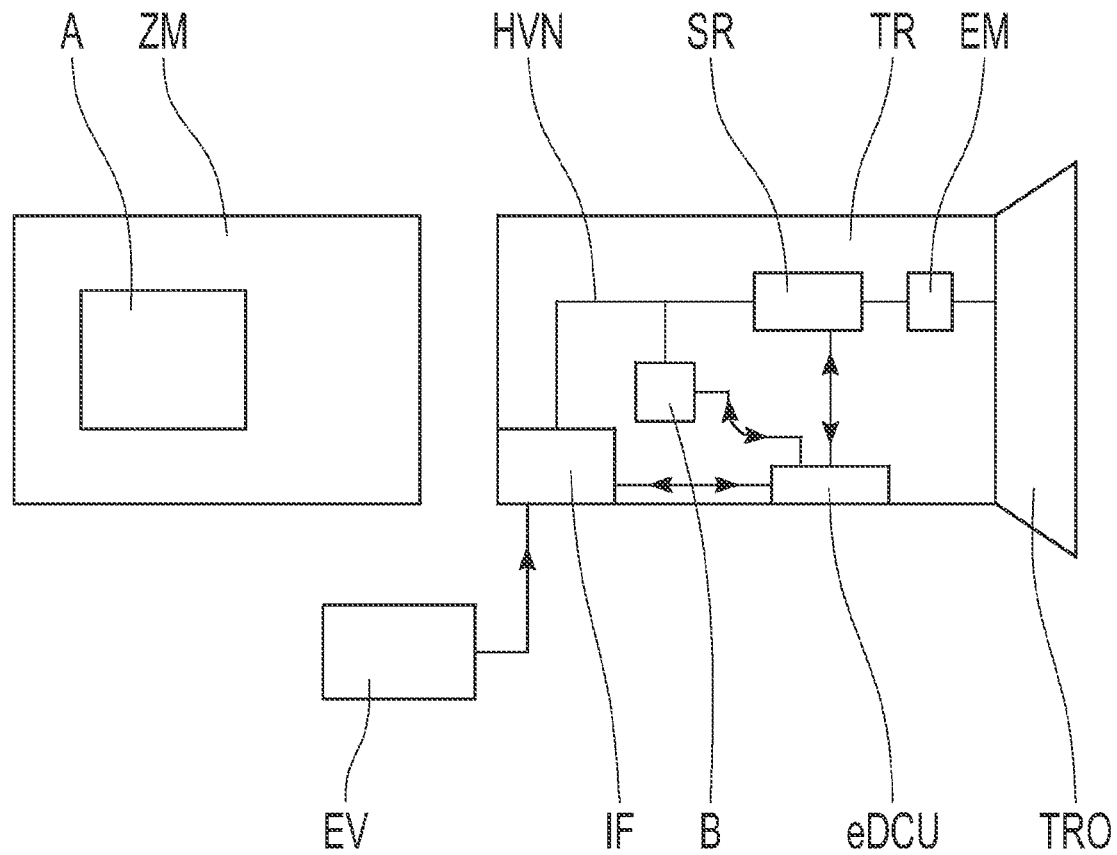
FIG. 1 illustrates a first block diagram of an electric drive according to an embodiment of the invention in a truck mixer.

An electric drive for a mixer drum and a method for operating this drive according to embodiments of the present invention have the advantage that, since only the charging of the battery takes place using a stationary power supply, the mixer drive is no longer coupled to the drive train for the vehicle. The coupling as in the prior art leads to safety-related issues which can be eliminated according to embodiments of the invention. Moreover, a generator of the vehicle then needs to be designed only for the on-board electrical system, the generator then being driven by an internal combustion engine of the vehicle, which drives said on-board electrical system, via a power take-off. There is thus overall no energy-transmitting connection from the drive of the vehicle to the electric drive for the mixer drum. That then furthermore simplifies the cabling and construction when the mixer drum is located on a trailer, for example. As a result, complex monitoring of the generator is then dispensed with and monitoring and control of the control device which controls the drive according to an embodiment of the invention also becomes significantly easier.

An electric drive for a mixer drum is thus disclosed, wherein provision is made for a high-voltage DC voltage power supply system to which at least one battery, a power converter and at least one interface for connecting a stationary electric power supply are connected, wherein the at least one battery is charged only via the at least one external interface, wherein provision is made for a control device which controls flows of energy from and to the components connected to the high-voltage DC voltage power supply system. Furthermore, a corresponding method for operating this electric drive is provided.

The electric drive is understood to mean the components defined according to embodiments of the invention which are necessary for driving the mixer drum. There is thus no further drive of hydraulic or mechanical type, rather only the electric drive defined according to embodiments of the invention.

The high-voltage DC voltage power supply system connects the connected components such that electric energy can be transported between them via the high-voltage DC voltage power supply system. The voltage in this case can be between 100 and 800 V.

The battery is therefore a high-voltage battery matched to the energy demand for the mixer drum and the use conditions. Advantageously, the battery is installed such that its capacity can be easily increased or decreased depending on what the use of the truck mixer requires.

In the present case, the mixer drum is arranged on a mobile concrete mixer, which is therefore also called a truck mixer. In particular concrete is conveyed into the rotating mixer drum in this case. The truck mixer transports the concrete thus mixed to a construction site, for example. Three- or four-axle trucks can be used as truck mixers. Semitrailer trucks are also possible.

The power converter can be understood to mean an inverter, rectifier or DC-DC voltage converter, depending on which use is required.

The external interface to the outside is designed such that it allows the connection of an external electric energy source mechanically, for example using a socket for three-phase current or AC current, but an external DC voltage source can also be connected in the present case. For this purpose, the interface then preferably has a plurality of sockets so that the appropriate current source can be connected depending on the situation. Furthermore, the interface also has power converters in order to convert the external electric energy to the appropriate parameters for the high-voltage DC voltage power supply system, i.e. to a DC voltage of the appropriate magnitude.

The control device processes signals from the components or further signal sources in the truck mixer and generates control signals therefrom for the components which are connected to the high-voltage DC voltage power supply system or other signal receivers inside and/or outside of the truck mixer. For this purpose, the control device has processing means which are at least in the form of software. It is possible for the control device to be present only as software but it can also have dedicated hardware. The software can be based on a deterministic algorithm or, instead or in addition, can use a neural network. In particular, the control device can have a dedicated housing having appropriate interfaces.

The flows of energy denote the transport of electric energy via the high-voltage DC voltage power supply system.

Provision is made for the external interface to be designed to draw DC current and/or AC current, wherein the external interface has a DC-DC voltage converter for the DC current and a rectifier for the AC current.

Provision is furthermore made for the control device to take a first signal, which indicates a state of the at least one battery, as a basis for outputting a second signal for an output device for a user of the mixer. The state of charge of the battery, for example, is thereby taken as a basis for communicating to the user whether a further charging operation is necessary. The output device can be in visual form, for example as a display, or in audible form as a loud-speaker. The signals are data signals.

Provision is additionally made for the control device to take the first signal as a basis for outputting a third signal, which affects a power delivery or power draw. The third signal can thus be used to control the components on the high-voltage DC voltage power supply system or further components such as the electric motor in terms of their power draw.

Furthermore, it is possible for the control device to be configured to supply the power converter with electric energy only via the external interface. In such a case, the battery is thus bypassed and/or only charged. This can be accomplished at the battery by interrupting energy delivery. To this end, the control device can instruct the battery control device as appropriate, for example, or the control device undertakes this task itself.

It is also possible for the control device to control the charging of the at least one battery on the basis of further available stationary power supplies. It is thereby then possible to plan how long the battery has to be charged for until it can be charged with the next available power supply. To this end, it is then also possible to use data about how high the expected energy consumption of the energy will be by then.

Provision can accordingly be made for the control device to control the charging of the at least one battery on the basis of a future energy demand. This then requires stored data about the use of the truck mixer.

For this purpose, provision can then be made for the control device to determine the future energy demand on the basis of a planned running time.

Exemplary embodiments of the invention are illustrated in the drawing and are explained in more detail in the following description.

In the drawing:

FIG. 1 shows a first block diagram of an electric drive for the mixer drum. The electric drive for the mixer drum TRO is located on a trailer TR. In this case, an external power supply EV is connected to the trailer TR, and in the process to the electric drive, via the interface IF. In the present case, the interface IF, the battery B and the power converter SR are connected to the high-voltage DC voltage power supply system HVN electrically connecting these components. The power converter is connected to the electric motor EM in order to supply it with power, said motor rotating the mixer drum TRO by using a reduction gear, for example. A control device eDCU is connected at least to the interface IF, the battery B and the power converter SR for signalling purposes. It is possible for the control device eDCU to be connected to more or fewer components.

The drive A driving the tractor unit ZM is arranged in the tractor unit ZM. This drive A is in no way connected to the electric drive for the mixer drum. According to the requirements, a flow of energy is not possible between these drives. The tractor unit ZM and the trailer TR are of course connected to one another mechanically such that the tractor unit ZM pulls the trailer TR.

The energy from the external power supply EV can supply the battery B and/or the power converter SR with electric energy via the high-voltage DC voltage power supply system HVN. Both components can be disengaged from the high-voltage DC voltage power supply system. This can be done using the control device eDCU.

Figure 2:
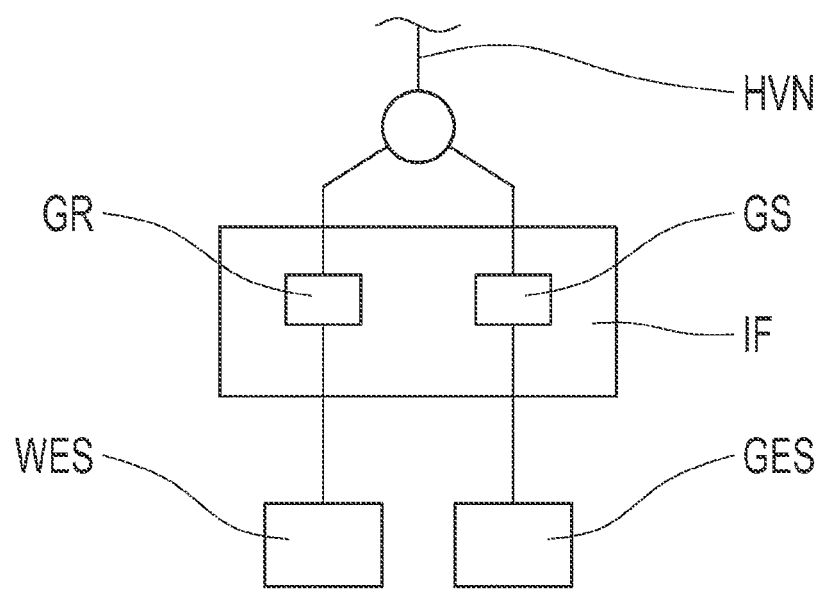
FIG. 2 illustrates a second block diagram of an external interface.

FIG. 2 shows, in a second block diagram, the interface IF having a connection for a first external power supply with AC voltage WES and having a connection for a second power supply with DC voltage GES. In the case of the AC voltage WES, the interface IF has a rectifier GR which rectifies the AC voltage to give a DC voltage. In the case of the DC voltage, the interface IF has a DC-DC voltage converter which converts the externally supplied DC voltage into the voltage for the high-voltage DC voltage power supply system HVN. The rectifier GR can likewise connect to a DC-DC voltage converter. This DC voltage is then in each case routed to the high-voltage DC voltage power supply system HVN.

Figure 3:
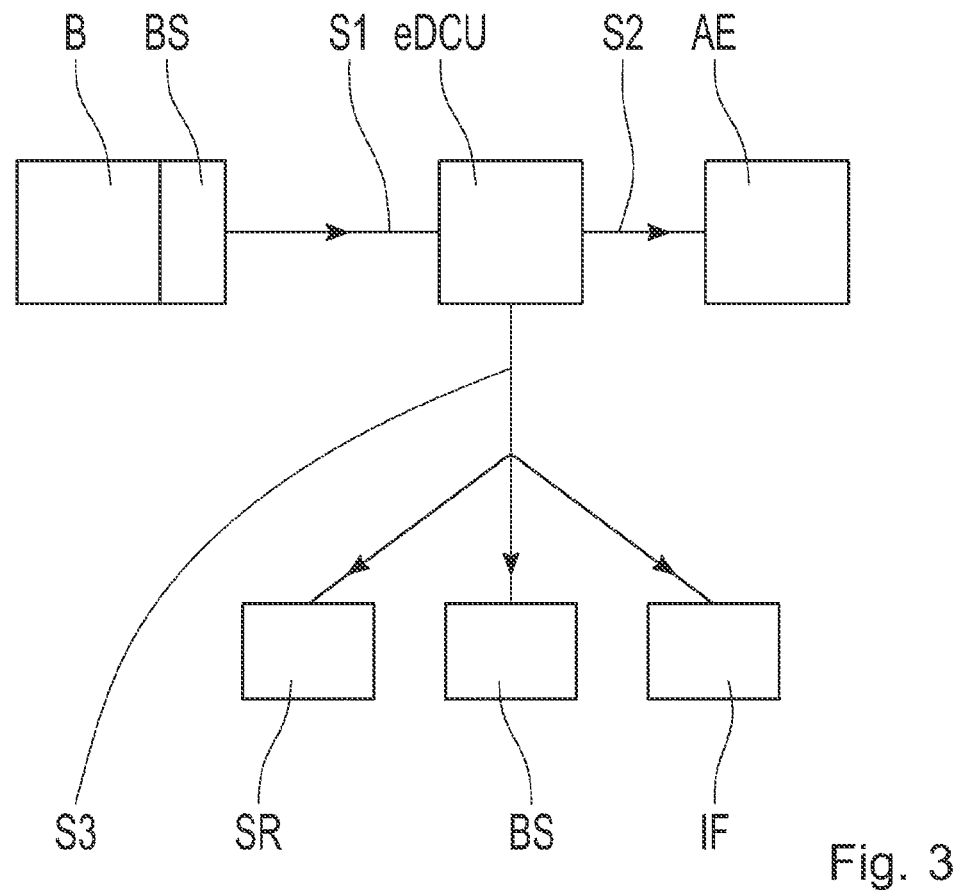
FIG. 3 illustrates a third block diagram of a control by a control device.

FIG. 3 shows, in a third block diagram, that the control device eDCU takes a first signal S1 from the battery B, and in this case from the battery control device BS, as a basis for using a second signal S2 to control an output device AE. This information displayed on the output device AE informs the user, for example, about the state of charge of the battery B. Using the signal S3, the control device eDCU controls the power converter SR, the battery control device BS and the interface IF in order to control the power draw and/or power delivery on the basis of the state of charge of the battery or other battery parameters.

Figure 4:
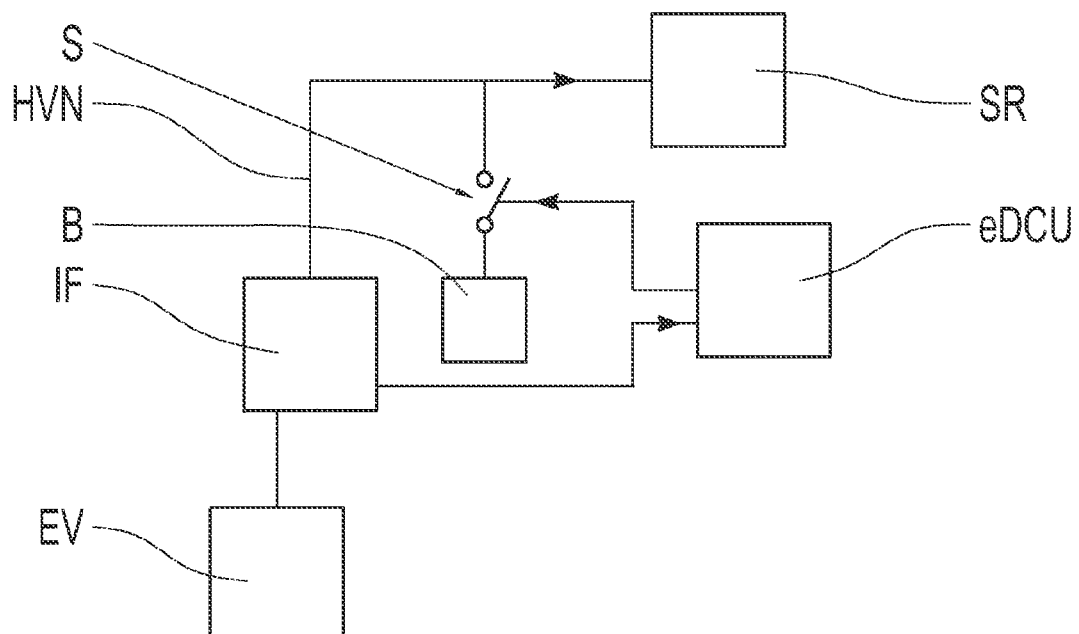
FIG. 4 illustrates a fourth block diagram of a direct supply of power from outside.

FIG. 4 shows, in a fourth block diagram, that, when an external power supply EV is connected to the interface IF, the control device eDCU removes the battery from the high-voltage DC voltage power supply system HVN by using a switch S. The power converter SR is thereby supplied with power only by the external power supply EV.

Figure 5:
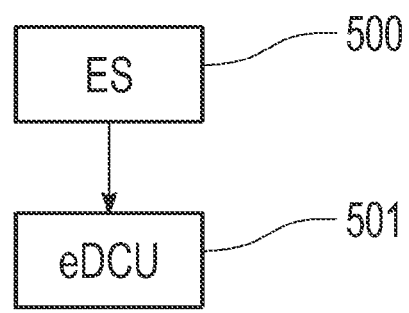
FIG. 5 illustrates a flowchart of a method according to an embodiment of the invention.

FIG. 5 illustrates the method according to an embodiment of the invention by way of a flowchart. In method step 500, an external power supply EV is connected to the interface IF in order to attain a flow of energy from the interface IF to the battery B and to the power converter SR via the high-voltage DC voltage power supply system HVN. In method step 501, the control device eDCU controls the flows of energy via the high-voltage DC voltage power supply system HVN.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

A drive
B battery
ZM tractor unit
TR trailer
TRO mixer drum
EV external power supply
S switch
IF interface
eDCU control device
S1, 2, 3 signal connections (signals)
SR power converter
EM electric motor
HVN high-voltage DC voltage power supply system
GR rectifier
GS DC-DC voltage converter
WES external AC power supply
GES external DC power supply
BS battery control device
AE output device
500, 501 method steps

The invention claimed is:

1. An electric drive, comprising:
a high-voltage DC voltage power supply to which at least one battery, a power converter and at least one external interface for connecting a stationary electric power supply are connected;
a mixer drum; and
an electric motor connected to the power converter and configured to rotate the mixer drum,
wherein the at least one battery is charged only via the at least one external interface, wherein a controller is configured to control flows of energy from and to components connected to the high-voltage DC voltage power supply.

2. The electric drive as claimed in claim 1, wherein the external interface is configured to draw DC current and/or AC current, and wherein the external interface has a DC-DC voltage converter for the DC current and a rectifier for the AC current.

3. The electric drive as claimed in claim 1, wherein the controller takes a first signal, which indicates a state of the at least one battery, as a basis for outputting a second signal to an output device for a user of the mixer drum.

4. The electric drive as claimed in claim 3, wherein the controller takes the first signal as a basis for outputting a third signal, which affects a power delivery or power draw.

5. The electric drive as claimed in claim 1, wherein the controller is configured to supply the power converter with electric energy only via the external interface.

6. The electric drive as claimed in claim 1, wherein the controller controls charging of the at least one battery on the basis of further available stationary power supplies.

7. The electric drive as claimed in claim 1, wherein the controller controls charging of the at least one battery on the basis of a future energy demand.

8. The electric drive as claimed in claim 7, wherein the controller determines the future energy demand on the basis of a planned running time.

9. A method for operating an electric drive for a mixer drum having a high-voltage DC voltage power supply, the method comprising:
connecting at least one battery, a power converter and at least one external interface for connecting a stationary electric power supply to the high-voltage DC voltage power supply, wherein the at least one battery is charged only via the at least one external interface;
providing a controller which controls flows of energy from and to components connected to the high-voltage DC voltage power supply; and
rotating the mixer drum via the controller.

10. An electric drive for a mixer drum, comprising a high-voltage DC voltage power supply to which at least one battery, a power converter and at least one external interface for connecting a stationary electric power supply are connected,
wherein the at least one battery is charged only via the at least one external interface,
wherein a controller is configured to control flows of energy from and to components connected to the high-voltage DC voltage power supply, and
wherein the controller controls charging of the at least one battery on the basis of further available stationary power supplies or on the basis of a future energy demand.

11. The electric drive as claimed in claim 10, wherein the controller determines the future energy demand on the basis of a planned running time.

* * * * *